(12) United States Patent
Manico et al.

(10) Patent No.: US 6,628,326 B1
(45) Date of Patent: Sep. 30, 2003

(54) WIRELESS COMMUNICATION SYSTEM FOR TRANSMITTING IMAGES FROM AN ENABLED ELECTRONIC CAMERA TO RECEIVER

(75) Inventors: Joseph A. Manico, Rochester, NY (US); Robert L. Baldino, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/337,240

(22) Filed: Jun. 22, 1999

Related U.S. Application Data (63) Continuation of application No. 60/122,235, filed on Mar. 1, 1999, and a continuation of application No. 60/120,621, filed on Feb. 18, 1999, and a continuation of application No. 60/120,613, filed on Feb. 18, 1999, and a continuation of application No. 60/118,798, filed on Feb. 5, 1999.

(51) Int. Cl.[7] ............................. H04N 5/232; H04B 1/38
(52) U.S. Cl. ............................. 348/211.12; 348/333.01; 348/373; 348/375; 455/557
(58) Field of Search ........................ 348/211.1–211.12, 348/207.99, 211.99, 375, 373, 374, 376, 207.2, 231.94, 333.01, 333.05; 455/556, 557

(56) References Cited

U.S. PATENT DOCUMENTS

| | | | | |
|---|---|---|---|---|
| 4,420,773 A | * | 12/1983 | Toyoda et al. | ........... 348/231.1 |
| 4,937,676 A | * | 6/1990 | Finelli et al. | ............... 348/375 |
| 5,179,446 A | | 1/1993 | Hong | |
| 5,432,871 A | * | 7/1995 | Novik | ...................... 348/14.13 |
| 5,666,159 A | * | 9/1997 | Parulski et al. | .......... 348/211.2 |
| 5,894,326 A | * | 4/1999 | McIntyre et al. | ...... 348/333.06 |
| 5,917,542 A | * | 6/1999 | Moghadam et al. | ... 348/231.99 |
| 6,052,509 A | * | 4/2000 | Abe | ............................. 386/117 |
| 6,191,814 B1 | * | 2/2001 | Elberbaum | ............... 348/211.5 |
| 6,219,560 B1 | * | 4/2001 | Erkkila et al. | ............... 455/557 |
| 6,278,884 B1 | * | 8/2001 | Kim | ........................... 455/556 |
| 6,429,896 B1 | * | 8/2002 | Aruga et al. | ........... 348/231.99 |
| 6,480,671 B2 | * | 11/2002 | Takahashi et al. | .......... 386/117 |

FOREIGN PATENT DOCUMENTS

| | | |
|---|---|---|
| GB | 2288300 A | 11/1995 |
| JP | 09093567 | 4/1997 |
| JP | 10145637 | 5/1998 |

* cited by examiner

*Primary Examiner*—Wendy R. Garber
*Assistant Examiner*—Lin Ye
(74) *Attorney, Agent, or Firm*—Thomas H. Close

(57) ABSTRACT

A wireless communications system for transmitting and receiving images and audio information includes a receiver including a display for displaying received images and a speaker for producing audio signals, a processing unit for storing ID code signals for decoding the received images and audio signals and receives an RF signal containing images and audio information. The receiver is responsive to the ID code signal for extracting the received image and audio signals of the images and the audio information from the RF signal. An electronic camera has an image sensor for capturing one or more images of a scene and producing image signals, and receives audio signals to produce audio information signals. A second processing unit is provided for encoding and then superimposing the image and audio signals onto an RF carrier, and transmits the RF carrier and superimposed signals. First and second interconnects respectively included in the receiver and the electronic camera are adapted when interconnected to transfer the ID code signal from the camera to the receiver where it is stored, to thereby permit the electronic camera to communicate with the receiver.

5 Claims, 12 Drawing Sheets

WIRELESS COMMUNICATION SYSTEM FOR TRANSMITTING IMAGES FROM AN ENABLED ELECTRONIC CAMERA TO RECEIVER

CROSS REFERENCE TO RELATED APPLICATIONS

Reference is made to commonly assigned U.S. Provisional Patent Application Ser. No. 60/118,798 filed Feb. 5, 1999, entitled "Communicating In The Presence Of Periodic Microwave Noise" by Carlson et al; U.S. Provisional Application Ser. No. 60/120,613, filed Feb. 18, 1999, entitled "Dynamic Packet Sizing in an RF Communications System" by Allen et al; U.S. Provisional Application Ser. No. 60/120,621 filed Feb. 18, 1999, entitled "Dual Purpose Receiver" by Allen et al, and U.S. Provisional Application Ser. No. 60/122,235 filed Mar. 1, 1999, entitled "FSK Signal Detection in the Presence of Fading" by Grant B. Carlson, the disclosures of which are incorporated herein by reference.

FIELD OF THE INVENTION

This invention relates to wireless communication systems which includes an electronic camera and a receiver.

BACKGROUND OF THE INVENTION

Presently there are numerous electronic camera and receiver systems. For example, in security systems a designated camera typically takes motion pictures of a scene and produces video signals which are sent to a receiver. The receiver will either record the signals or display the signals or a combination thereof. In such systems the camera is typically in a dedicated position.

U.S. Pat. No. 5,179,446 to Hong, a system where video and audio signals are transferred from a video camera to a display unit. These signals are encoded and later decoded in the receiver. In this arrangement a decoding key is already provided in the receiver. This of course presents a possible security problem.

Thus there is a problem with prior art arrangements in that they often can be easily monitored by an unauthorized user.

SUMMARY OF THE INVENTION

It is an object of the present invention to provide an electronic camera-receiver combination which prevents the unauthorized monitoring of RF signals.

It is another object of the present invention to provide a wireless communications system wherein a plurality of cameras can be enabled to operate with a receiver.

These objects are achieved by a wireless communications system for transmitting and receiving images and audio information, comprising:

a) a receiver including a display for displaying received images and a speaker for producing audio signals, a processing unit for storing ID code signals for decoding the received images and audio signals and means for receiving an RF signal containing images and audio information and means responsive to the ID code signal for extracting the received image and audio signals of the images and the audio information from the RF signal;

b) an electronic camera having an image sensor for capturing one or more images of a scene and producing image signals, and including means for receiving audio signals to produce audio information signals, a second processing unit for encoding and then superimposing the image and audio signals onto an RF carrier, and means for transmitting the RF carrier and superimposed signals; and c) first and second interconnect means respectively included in the receiver and the electronic camera and being adapted when interconnected to transfer the ID code signal from the camera to the receiver where it is stored, to thereby permit the electronic camera to communicate with the receiver.

The advantage of the present invention is that a secure wireless communications system can be achieved without significant complexity. It is another advantage of the invention that a plurality of enabled cameras can be selectively monitored by a receiver.

DETAILED DESCRIPTION OF THE INVENTION

Figure 1A:
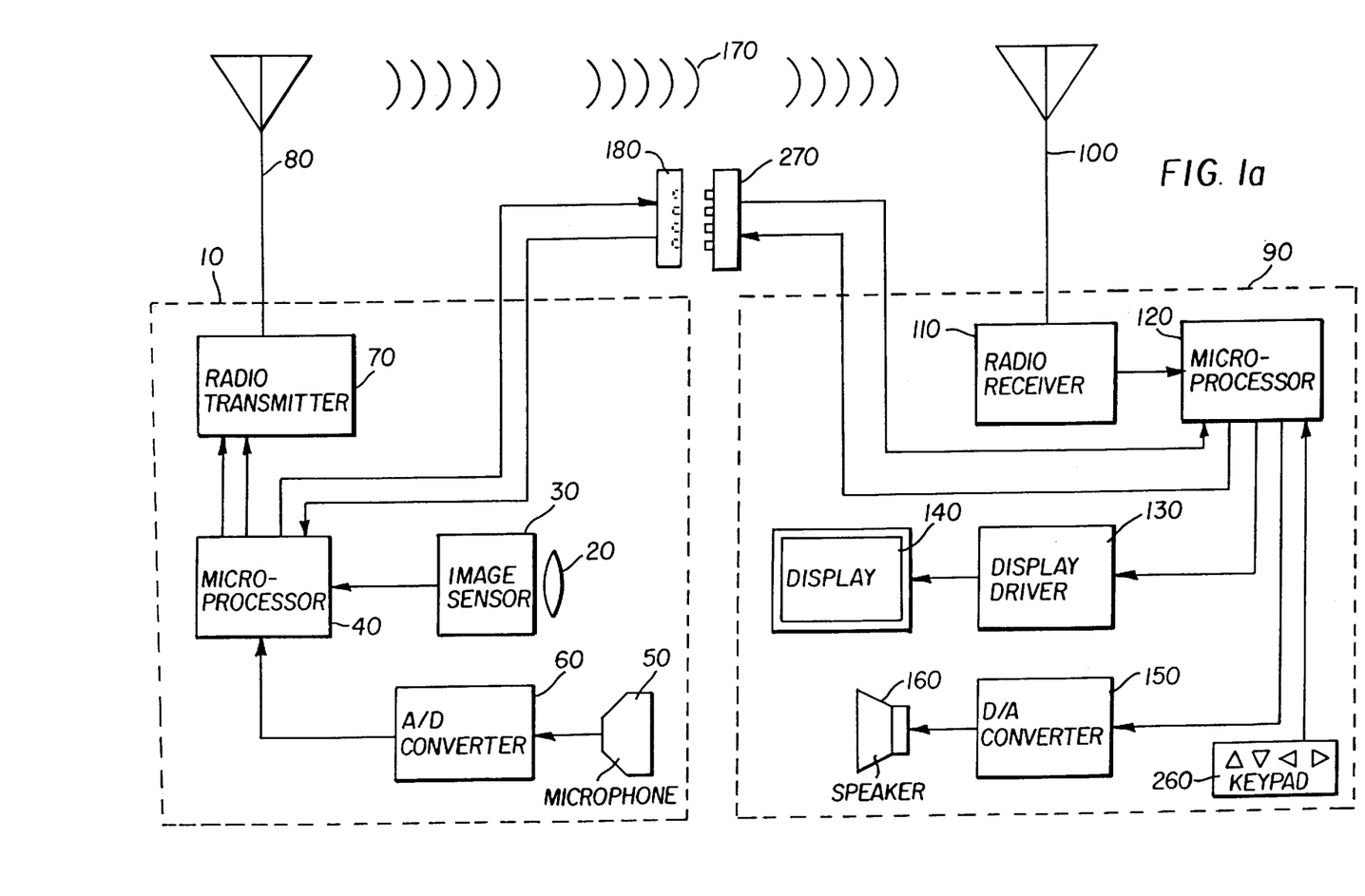
FIG. 1a is a block diagram of a wireless system having a receiver and electronic camera.

Turning now to FIG. 1a, a block diagram of a wireless system is shown to have a transmitting electronic camera 10 and a receiving electronic viewer 90. Light enters lens 20 and is focused on a "Camera on Chip" sensor 30 such as a CMOS sensor. The camera includes integrated electronics, and a microprocessor 40. The sensor 30 converts the image information into digital data which is transferred to microprocessor 40. Microphone 50 converts sound to electronic signals with are transferred to A/D converter 60. The electronic signals are converted to digital data and transferred to microprocessor 40. The sound and image data are encoded by microprocessor 40. These data can be optionally encrypted by standard encryption techniques such as a RSA type transform. The encoded sound and image data is transferred to radio transmitter 70, such as described in commonly-assigned U.S. patent application Ser. No. 60/118, 798, and broadcast via antenna 80.

Digital Radio Frequency (RF) signals 170 are received by antenna 100 of a receiver 90. The RF data is converted to digital data by digital radio receiver 110. The digital data is transferred to microprocessor 120 and converted to separate sound data and image data and deciphered. The digital sound data is transferred to D/A converter 150 and converted to electrical signals with are converted to sound by speaker 160. The digital image data is transferred to display driver 130 and converted to images which are viewable on display 140. As will be subsequently discussed, a ID code which has been received by the receiver 90 by the electronic camera 10 is used to decode the image data and audio signals. Menu and function selections are made via keypad 260 on receiver 90. Electro-mechanical connectors 180 and 270 allow the transmitting electronic camera 10 and receiver 90 to be physically and electronically linked.

Figure 1B:
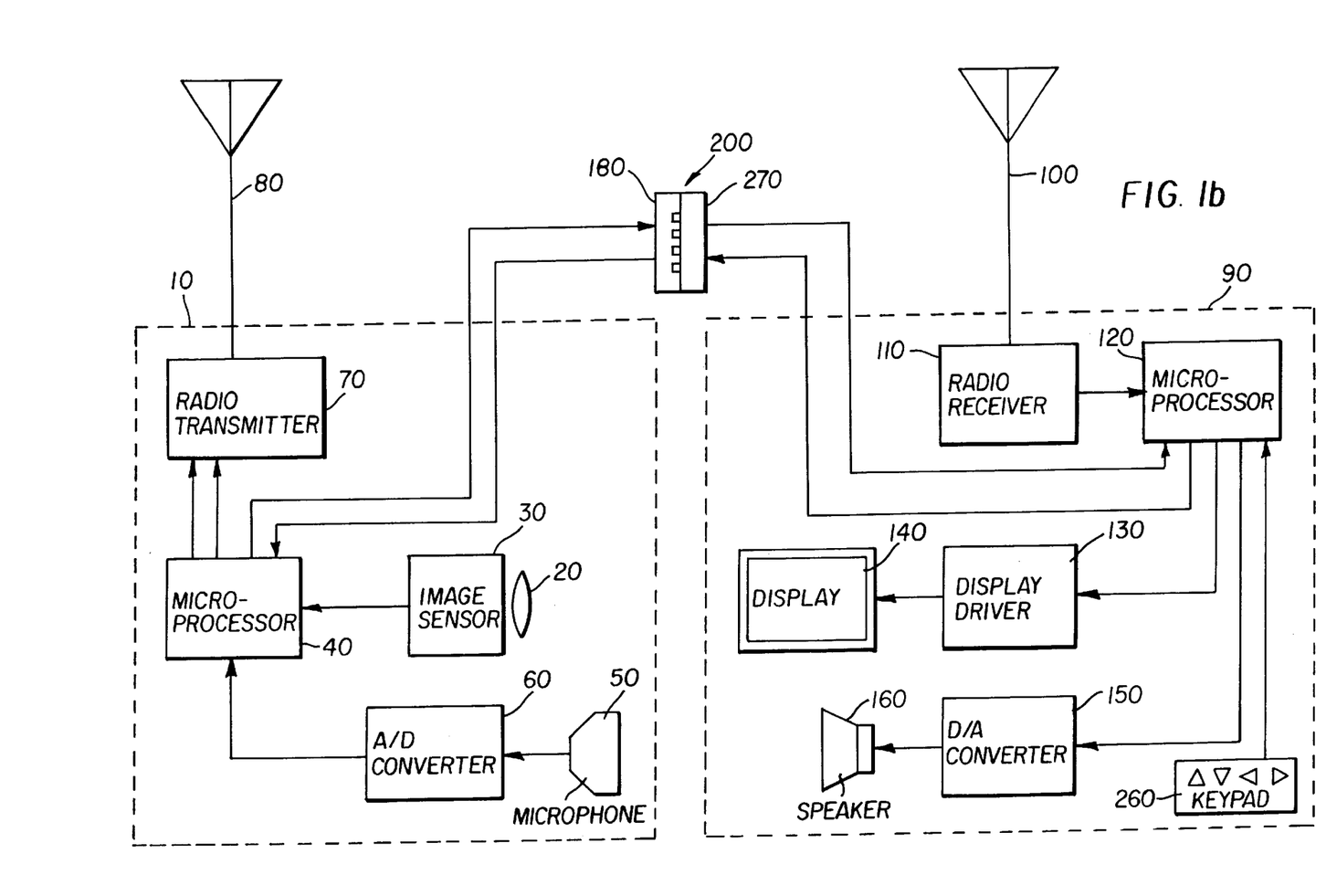
FIG. 1b is a block diagram of a wireless system having a receiver and electronic camera that are electro-mechanically linked.

FIG. 1b, a block diagram of a wireless system is shown to have a transmitting electronic camera 10 and a receiver 90 that are physically and electronically linked 200, by electro-mechanical connectors 180 and 270. In this "linked mode" the RF signal is terminated and the transmitter microprocessor 40 and receiver microprocessor 120 are enabled for two way direct communications. This allows for wired operation and other applications which will be made clear later in the detailed description.

Figure 1C:
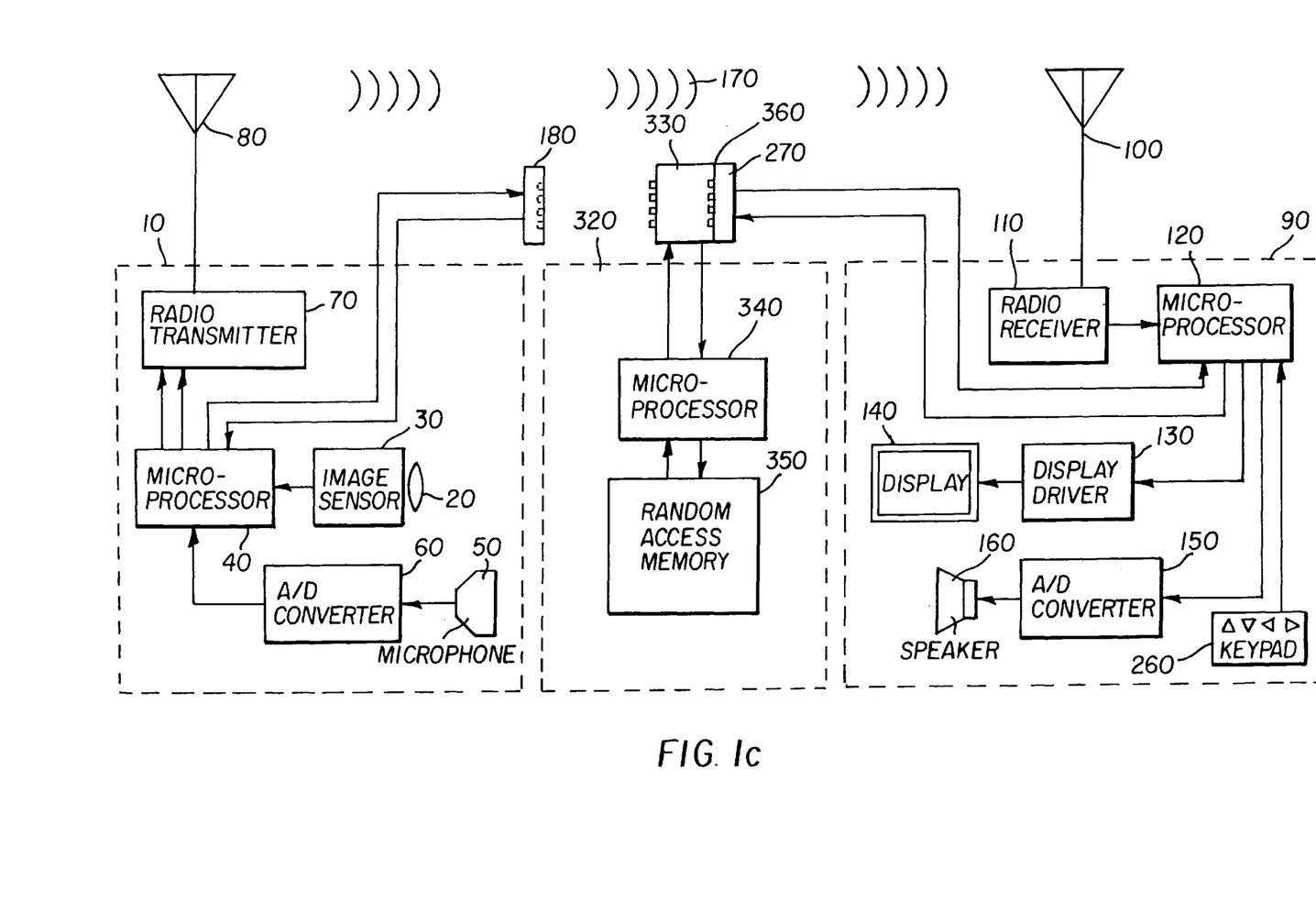
FIG. 1c is a block diagram of a wireless system having a receiver, electronic camera, and a sound and image storage module.

FIG. 1c, a block diagram of a wireless system is shown to have a transmitting electronic camera 10. In addition, receiving electronic viewer 90 and image/sound recording and playback module 320 are physically and electronically linked 360, by electro mechanical junction 330 and connector 270. In this "linked mode" the receiver microprocessor 120 and the image/sound recording and playback microprocessor 340 are enabled for two way direct communications. Random access memory 350 is available to store images and sound captured by transmitting electronic camera 10 and received by receiver 90 via RF signal 170. Images and sounds from transmitting electronic camera 10 are stored in random access memory 350 and can be selected using keypad 260 and viewed and heard on display 140 and speaker 160.

Figure 1D:
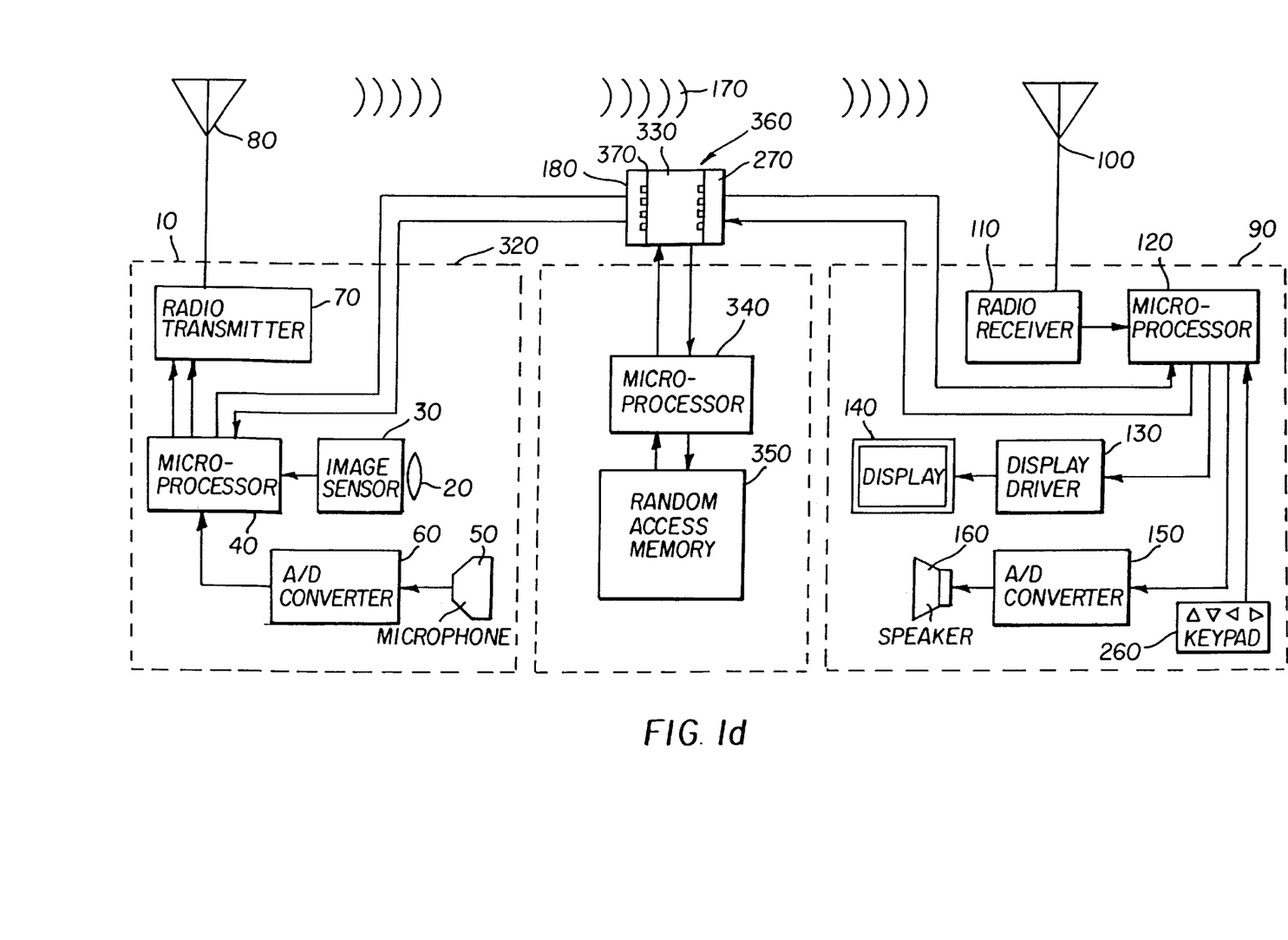
FIG. 1d is a block diagram of a wireless system having a receiver, electronic camera, and a sound and image storage module that are electro-mechanically linked.

FIG. 1d, a block diagram of a wireless system is shown to have a transmitting electronic camera 10, receiving electronic viewer 90, and image/sound recording and playback module 320, all of which are physically and electronically linked 360 and 370, by electro mechanical junction 330 and connectors 180 and 270. In this "linked mode" the RF signal is terminated and the transmitter microprocessor 40 and receiver microprocessor 120 are enabled for two way direct communications. In this "linked mode" transmitting electronic camera 10, receiver microprocessor 120, and the image/sound recording and playback microprocessor 340 are enabled for two way direct communications. Random access memory 350 is available to store images and sound captured by transmitting electronic camera 10 and received by receiver 90. Images and sounds from transmitting electronic camera 10 or stored in random access memory 350 can be selected using keypad 260 and viewed and heard on display 140 and speaker 160.

Figure 1E:
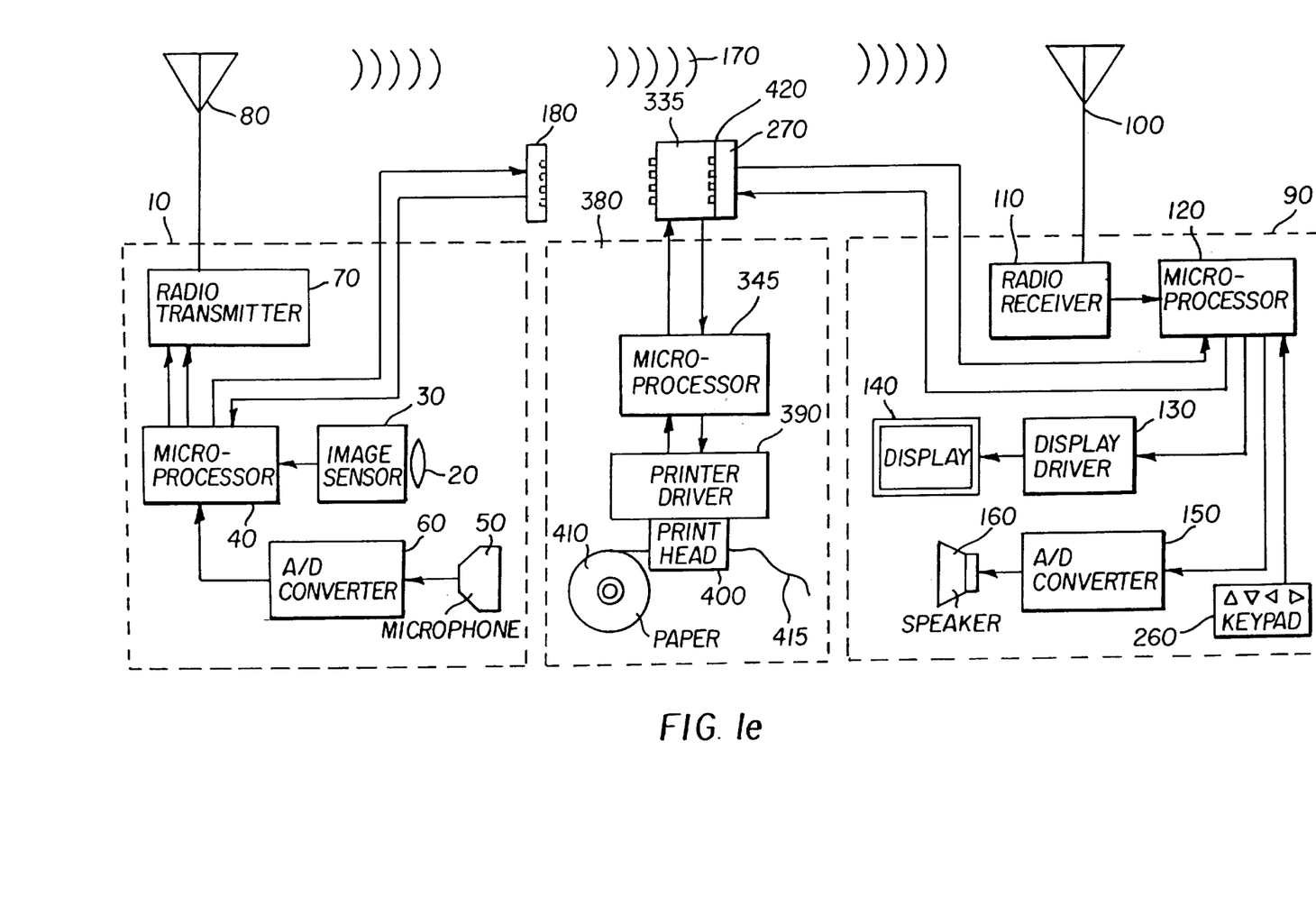
FIG. 1e is a block diagram of a wireless system having a receiver, electronic camera, and a printer module.

FIG. 1e, a block diagram of a wireless system is shown to have a transmitting electronic camera 10. In addition, receiver 90 and printer module 380 are physically and electronically linked 420, by electro mechanical junction 335 and connector 270. In this "linked mode" the receiver microprocessor 120 and the printer module microprocessor 345 are enabled for two way direct communications. Printer module 380 could be any color or black and white inkjet, thermal dye transfer, impact ribbon, or equivalent digital printer. Printer driver 390 is used to control print head 400 which prints images on paper 410, producing finished print 415. Images captured by transmitting electronic camera 10 and received by receiving electronic viewer 90 via RF signal 170 are transferred from receiving microprocessor 120 to printing microprocessor 345 by instructions received by keypad 260.

Figure 1F:
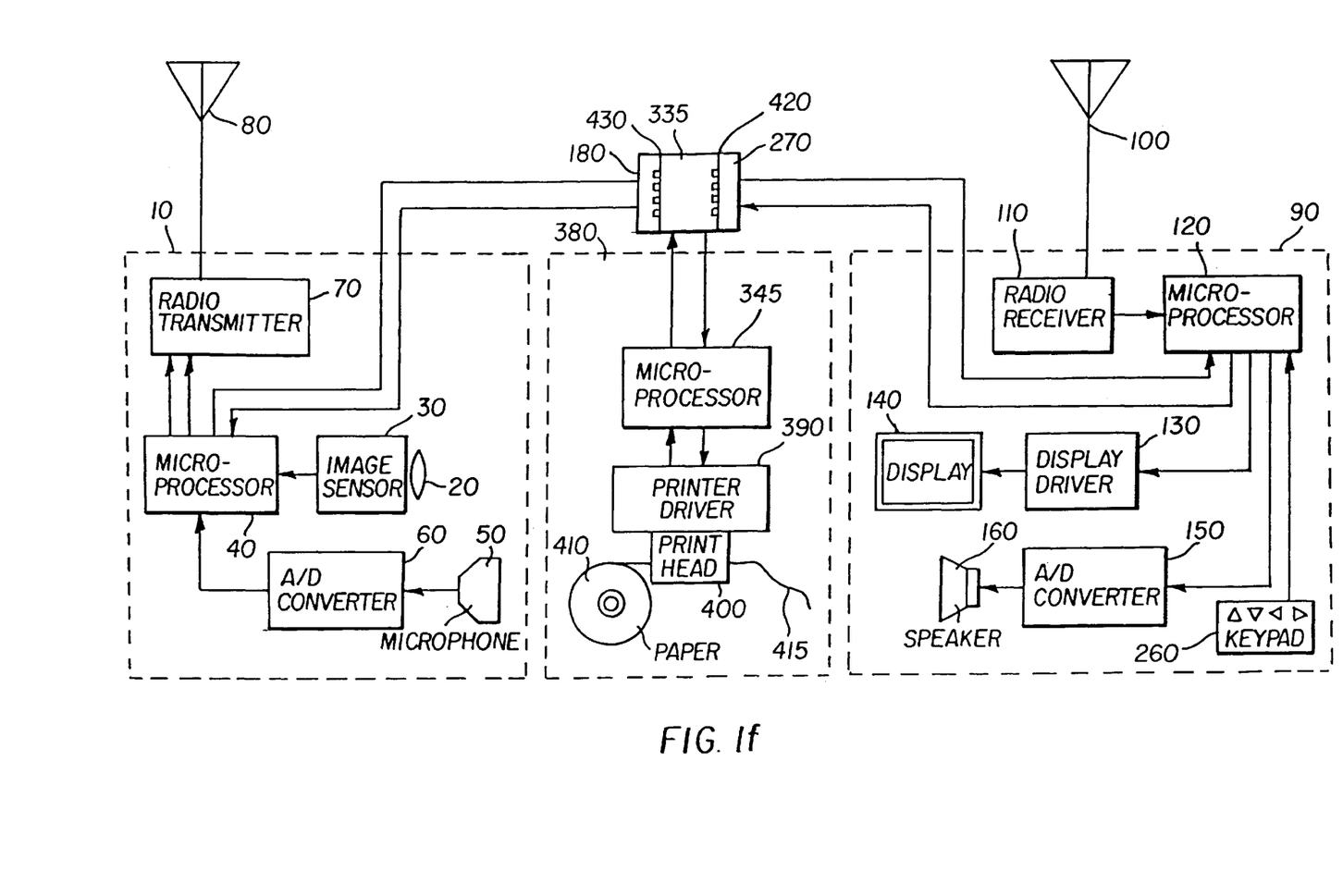
FIG. 1f is a block diagram of a wireless system having a receiver, electronic camera, and a printer module that are electro-mechanically linked.

FIG. 1f, a block diagram of a wireless system is shown to have a transmitting electronic camera 10, receiving electronic viewer 90, and printer module 380, all of which are physically and electronically linked 420 and 430, by electro mechanical junction 335 and connectors 180 and 270. In this "linked mode" the RF signal is terminated and the transmitter microprocessor 40 and receiver microprocessor 120 are enabled for two way direct communications. Images captured by transmitting electronic camera 10 and received by receiving electronic viewer 90 are transferred from receiving microprocessor 120 to printing microprocessor 345 by instructions received by keypad 260. In printer module 380 printer driver 390 is used to control print head 400 which prints images on paper 410, producing finished print 415.

In addition, not shown, image/sound recording and playback module 320 and printer module 380 may be physically and electronically linked to receiving electronic viewer 90 by means of image/sound recording electro-mechanical junction 330, printer electro-mechanical junction 335, and connector 270.

Two way communications links described in FIGS. 1b, 1d, and 1f are used to transfer unique codes from the transmitting electronic camera 10 to the receiving electronic viewer 90 to establish the proper ID code to decipher the RF signals between the units. In addition, in this linked mode images and sounds transferred in a direct wired mode. The communications links in FIGS. 1c, 1d, 1e, and 1f are used to transfer images and sounds to the image/sound recording and playback module 320 or images to printer module 380. In all cases when electro-mechanical links are established, information stored in the individual microprocessors is used to identify the type of components that are linked.

Figure 2:
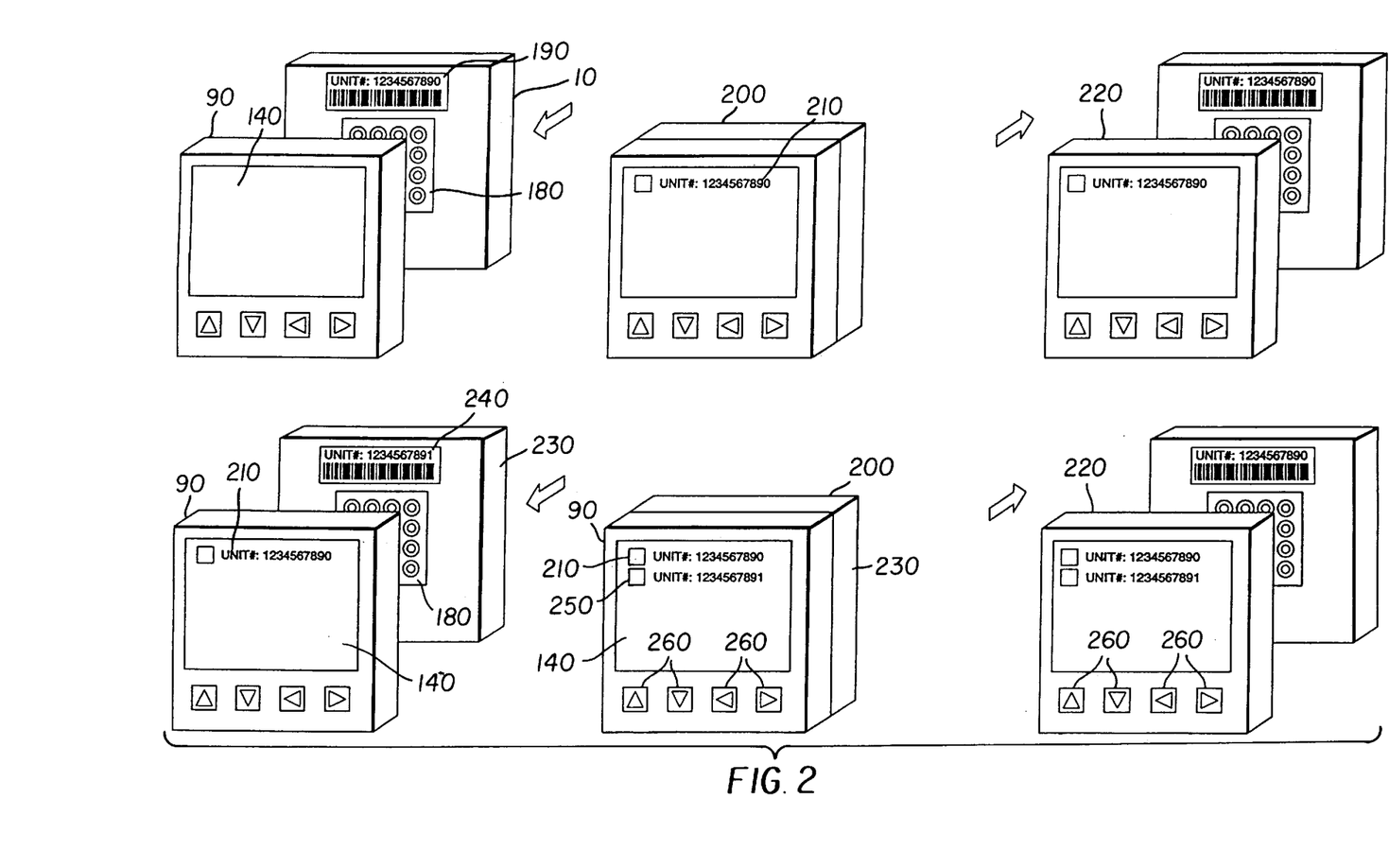
FIG. 2 is a schematic showing an electronic camera physically connected to a receiver to transfer the ID code from the camera to the receiver.

FIG. 2 depicts a perspective of the front of a receiver 90 and the back section of electronic camera 10 including the electro-mechanical connector 180. The individual modules are electro-mechanically connected 200 by connector 180 on the back of electronic camera 10 and corresponding connector, not shown, on receiver 90. The electro-mechanical connection transfers the ID code stored in computer memory in electronic camera 10 to computer memory in receiver 90. After successful transfer of the ID code to receiver 90 it is visible on display 140 as ID code 210. The digital sound and image data captured by the electronic camera 10 is now available as sound and images on receiver 90 through the electro-mechanical connection, if connected 200, or through digital RF transmission, if separated 220.

When a second electronic camera 230 is connected to receiver 90 via electro-mechanical connector 180 and corresponding connector, not shown, on receiver 90, the electro-mechanical connection transfers the ID code stored in computer memory in electronic camera 230 to computer memory in receiver 90. After successful transfer of the ID code to receiver 90 it is visible on display 140 as ID code 250. The digital sound and image data captured by of electronic camera 230 is now available as sound and images on receiver 90 through the electro-mechanical connection, if connected 200, or through digital RF transmission, if separated 220. The display 140 now depicts two ID codes 210 and 250. The user can select which image/sound feed appears on display 140 by using menu/feature selection buttons 260. In addition the printed machine/human readable ID code 190 on electronic camera 10 can be manually input to receiver 90 via menu/feature selection buttons 260. This procedure obviates the need to electro-mechanically link the electronic camera 10 and receiver 90 in order to exchange the ID code 190.

Figure 3A:
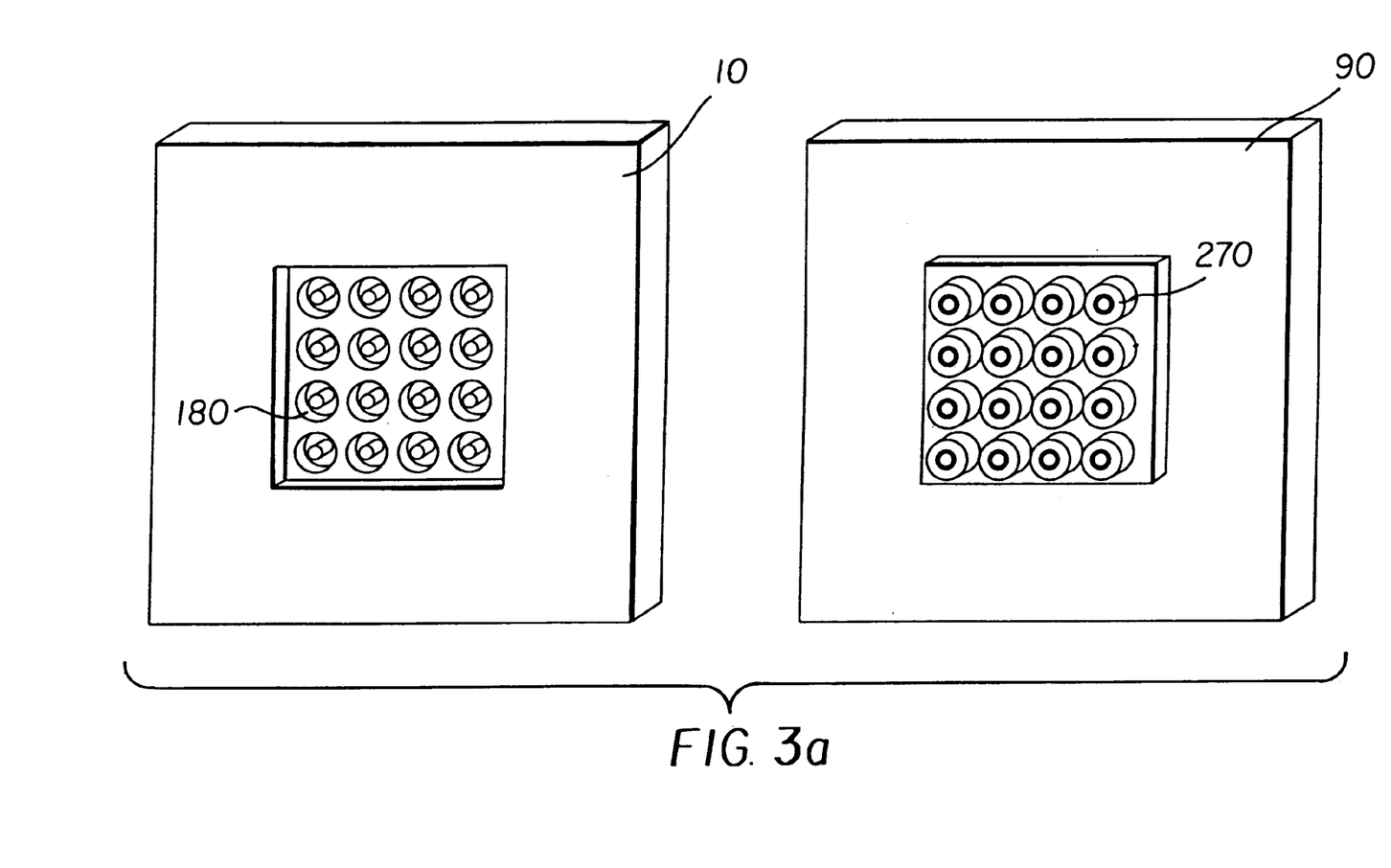
FIGS. 3a and 3b respectively show perspectives of the electrical/mechanical interconnects on the receiver and the electronic camera of FIG. 2.
Figure 3B:
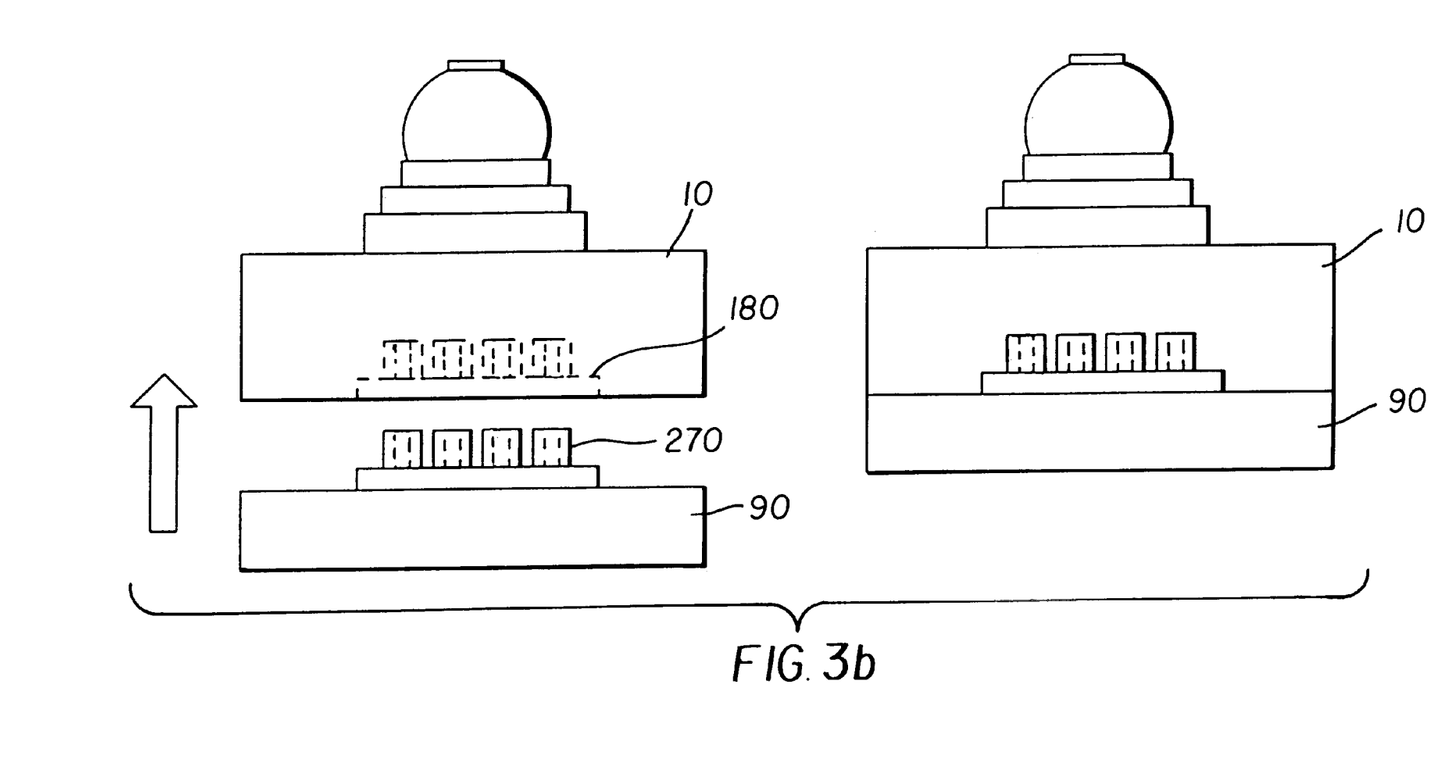

FIG. 3a and 3b respectively show perspectives of the electrical/mechanical interconnects on the receiver and the electronic camera of FIG. 1. FIG. 3a is a plan view of the back portion of electronic camera 10 showing a female electro-mechanical connector 180 and receiver 90 showing male electro-mechanical connector 270. FIG. 3b is a side phantom view of electronic camera 10 and receiver 90 prior to connection and then connected. Male and female connectors 270 and 180 are used to provide electrical and/or mechanical connection between modules.

Figure 4:
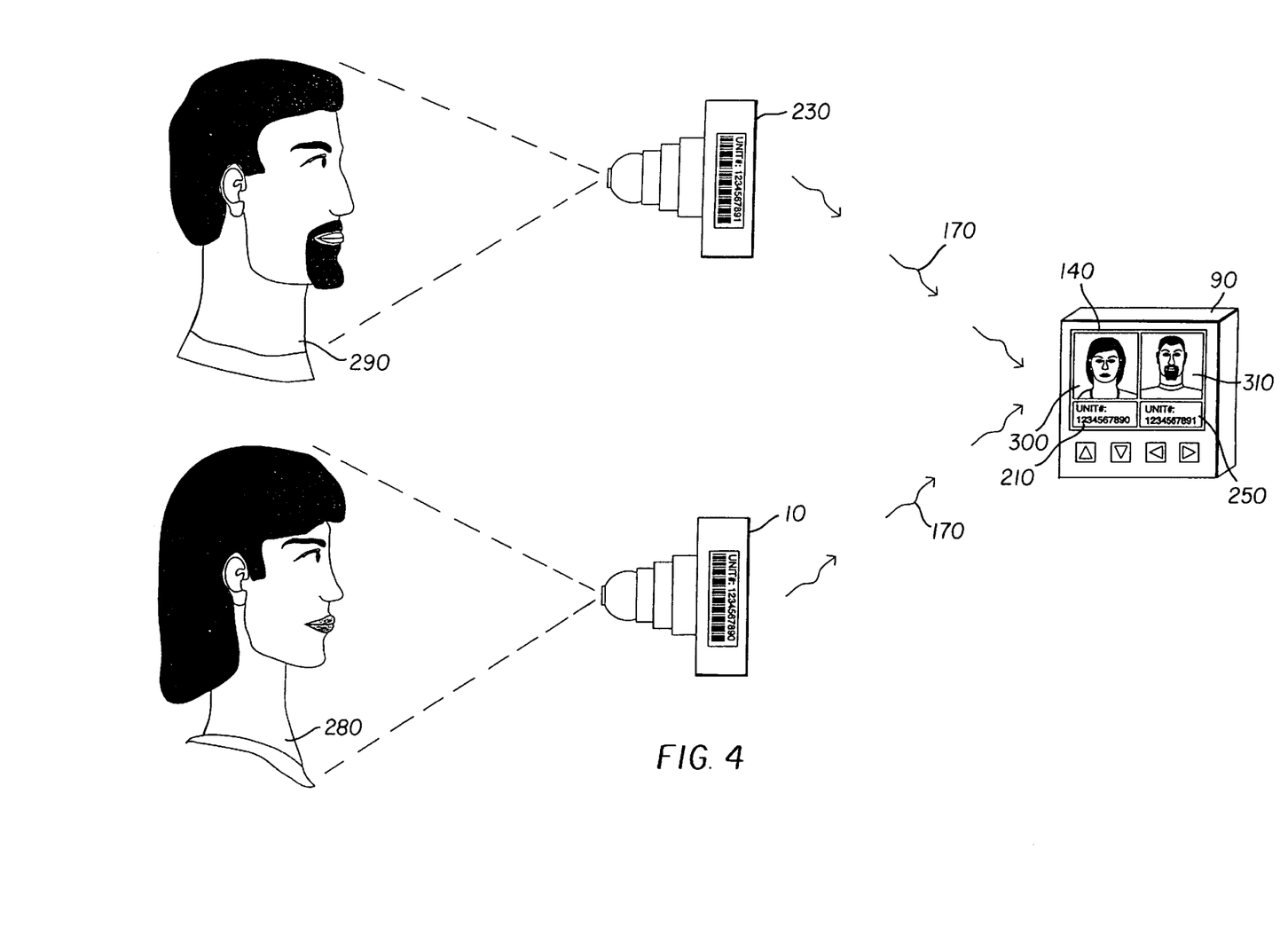
FIG. 4 is a schematic diagram showing that a single receiver can selectively be in communications with any one of a number of enabled electronic camera.

FIG. 4 depicts a side view of two imaging subjects 280 and 290. First imaging subject 280 is being captured by electronic camera 10 and second imaging subject 290 is being captured by electronic camera 230. Both electronic cameras had been previously connected to receiver 90 in order to transfer ID codes and are now transmitting RF signals 170 to receiver 90. The image from electronic camera 10 is displayed on viewer 140 as split screen image 300 with display of ID code 210 of the first electronic camera 10. The image from second electronic camera 230 is displayed on viewer 140 as split screen image 310 with display of ID code 250.

The receiver 90 can display images and play sound from any of the selected electronic cameras one at a time or the display can be used to show multiple images simultaneously by making the individual images smaller. Menu/feature selection buttons 260 can be used to highlight an individual image on a multiple image display to hear the sound captured by that individual electronic camera.

An additional method of providing ID codes to enable digital RF communication is by reading the printed machine/human readable ID code and manually entering the read ID code into the microprocessor 120 of the receiver 90 using menu/feature selection buttons 260 (FIG. 2). Additional electronic cameras can be added and selected in the same manner.

Figure 5A:
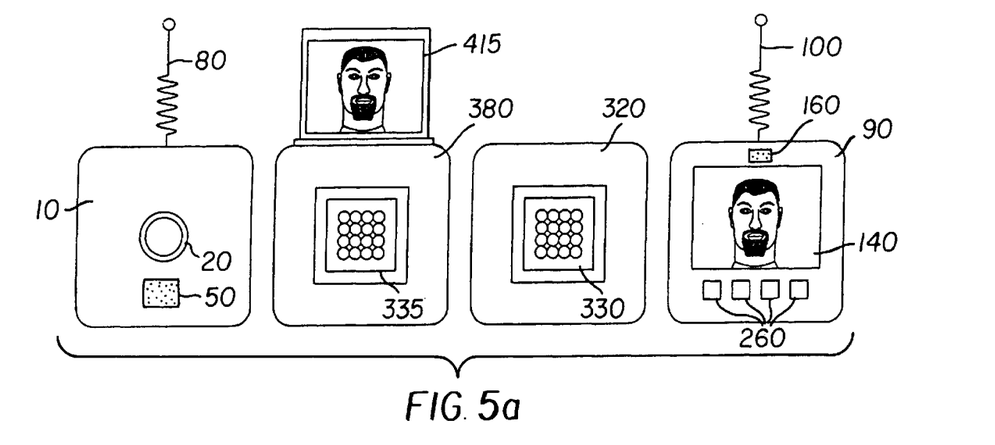
FIG. 5a shows a front view of an electronic camera, receiver, Image/sound recording and playback module, and the printer module, none of which are electrically/mechanically linked.

FIG. 5a depicts a front view of an electronic camera 10, receiver 90, image/sound recording and playback module 320, and the printer module 380. Printer 380 is shown with part of the electro-mechanical connector junction 335 visible on the front surface and the remaining part on the back surface, not shown. Image/sound recording and playback module 320 is shown with part of the electro-mechanical connector junction 330 visible on the front surface and the remaining part on the back surface, not shown.

Figure 5B:
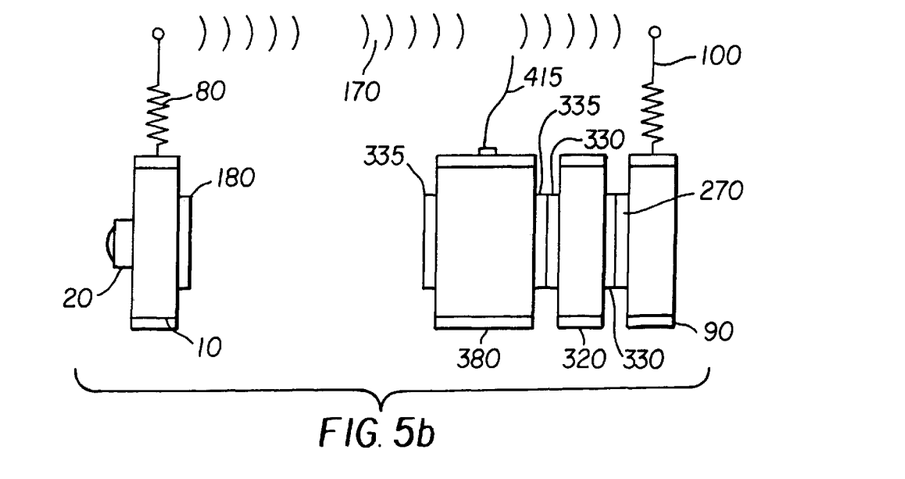
FIG. 5b shows a side view of an electronic camera which is transmitting to the linked receiver, image/sound recording and playback module, and printer module.

FIG. 5b depicts a side view of an electronic camera 10, which is transmitting to the receiver 90 via RF signal 170. Receiver 90 is linked to image/sound recording and playback module 320 and the printer module 380 via electro-mechanical connector junctions 335 and 330 and electro-mechanical connector 270. Image and sound information transmitted from electronic camera 10 and received by receiver 90 can be stored in image/sound recording and playback module 320 and/or images can be printed on printer module 380. These choices are made via keypad 260 shown in FIG. 5a.

Figure 5C:
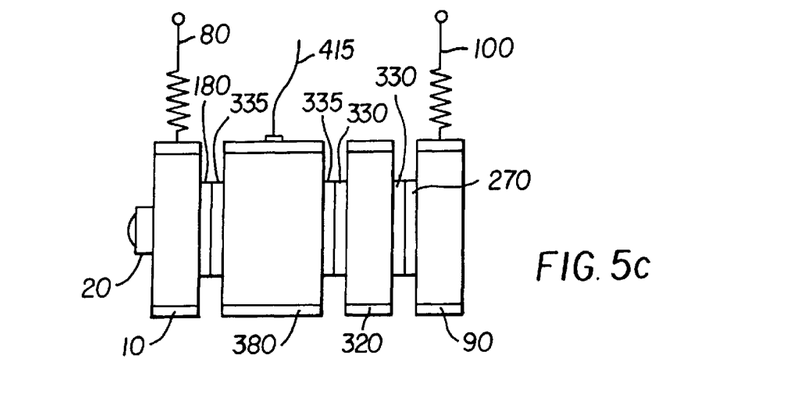
FIG. 5c shows a side view of an electronic camera, receiver, image/sound recording and playback module, and the printer module, all of which are electrically/mechanically linked.

FIG. 5c depicts a side view of an electronic camera 10, receiver 90, image/sound recording and playback module 320, and the printer module 380, all of which are electrically and mechanically linked via electro-mechanical connector junctions 335 and 330 and electro-mechanical connectors 270 and 180. This linked configuration enables ID codes to be exchanged between all modules and provides for wired operation.

Figure 6A:
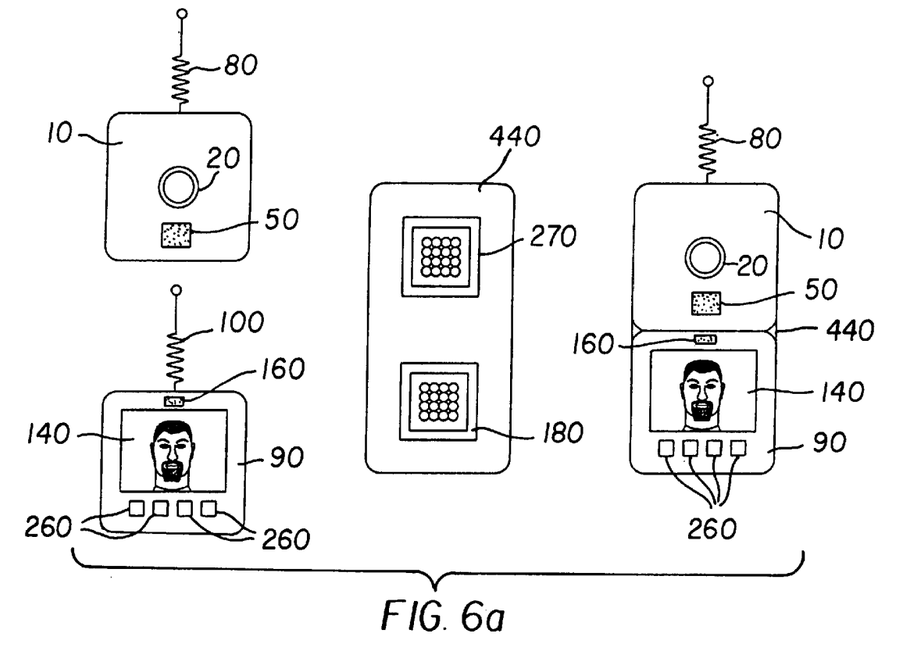
FIG. 6a shows a front view of an electronic camera, receiver, and a communication cradle as individual components and linked components.

FIG. 6a depicts a front view of an electronic camera 10, receiver 90, and communication cradle 440 as individual and linked modules. Communication cradle 440 provides a means for audio visual communication by mounting the electronic camera 10 in an orientation to capture the image and sounds produced by a user viewing receiver 90. In one implementation, Communication cradle 440 may only be used for mechanical connections to provide an ergonomic arrangement of modules or in another implementation it may contain electro-mechanical connections to provide access to extra batteries or a larger antennae stored within the unit, not shown.

Electronic camera 10 had been previously electro-mechanically linked to a second receiver, not shown, in order to exchange ID codes. A second electronic camera, not shown, had been previously electro-mechanically linked to a receiver 90, in order to exchange ID codes. Once this set up procedure has been accomplished electronic camera 10 and receiver 90 are plugged into cradle 440 via connector 270 and 180. The second electronic camera and receiver are plugged into a second communication cradle, not shown by similar means. In operation the sounds and images from electronic camera 10, are transmitted to the second receiver, not shown, and second electronic camera, not shown, transmits sounds and images to receiver 90. In this configuration the modules can be used as two way "video phones".

Figure 6B:
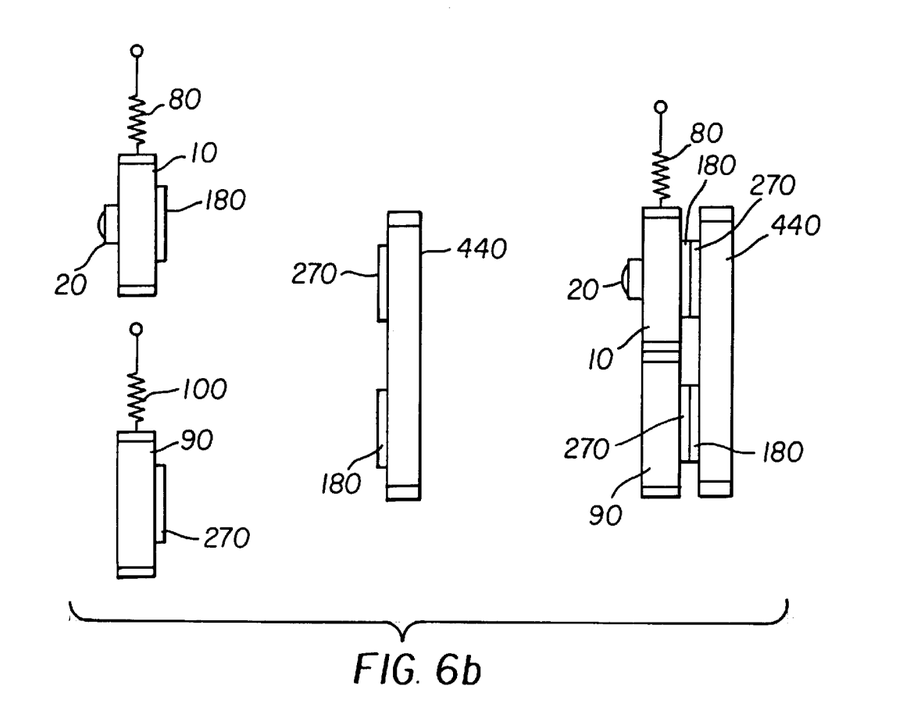
FIG. 6b shows a side view of an electronic camera, receiver, and a communication cradle as individual components and linked components.

FIG. 6b is a side view of an electronic camera 10 receiver 90, and communication cradle 440 as individual modules and linked modules and depicts the details of the connection means. Female electro-mechanical connector 180 on electronic camera 10 plugs into male connector 270 on cradle 440 and female connector 270 on receiver 90 plugs into male connector 180 on cradle 440.

The invention has been described in detail with particular reference to certain preferred embodiments thereof, but it will be understood that variations and modifications can be effected within the spirit and scope of the invention.

PARTS LIST

10 Electronic
20 Lens

-continued

| | |
|---|---|
| 30 | "Camera on Chip" image sensor |
| 40 | Microprocessor |
| 50 | Microphone |
| 60 | A/D converter |
| 70 | Radio transmitter |
| 80 | Antenna (transmitting) |
| 90 | Receiver |
| 100 | Antenna (receiving) |
| 110 | Radio receiver |
| 120 | Microprocessor |
| 130 | Display driver |
| 140 | Display |
| 150 | D/A converter |
| 160 | Speaker |
| 170 | Radio Signal |
| 180 | Electro-Mechanical connector (female) |
| 190 | Printed Machine/Human readable ID code |
| 200 | Camera/transmitter & Receivers electro-mechanically linked |
| 210 | Display of ID code of 1st Camera/transmitter |
| 220 | Camera/transmitter & Receivers digital RF linked |
| 230 | second Electronic camera |
| 240 | second Printed Machine/Human readable ID code |
| 250 | Display of ID code of second Camera/transmitter |
| 260 | Menu/feature selection buttons (keypad) |
| 270 | Electro-Mechanical connector (male) |
| 280 | First Imaging subject |
| 290 | Second Imaging subject |
| 300 | Split screen image from 1st Electronic camera |
| 310 | Split screen image from second Electronic camera |
| 320 | Image/sound recording and playback module |
| 330 | Image/sound recording Electro-Mechanical connector (male/female junction) |
| 335 | Printer Electro-Mechanical connector (male/female junction) |
| 340 | Image/sound recording Microprocessor |
| 345 | Printer Microprocessor |
| 350 | Random access memory |
| 360 | Receiver and Image/sound module electro-mechanically linked |
| 370 | Camera/transmitter and Image/sound module electro-mechanically linked |
| 380 | Printer module |
| 390 | Printer driver |
| 400 | Print head |
| 410 | Printer paper |
| 415 | Finished print |
| 420 | Receiver and Printer module electro-mechanically linked |
| 430 | Camera/transmitter and Printer module electro-mechanically linked |
| 440 | Communication cradle |

What is claimed is:

1. A wireless communications system for transmitting and receiving images and audio information, comprising:

a) a receiver module including a display for displaying received images and a speaker for producing audio signals, a processing unit for storing ID code signals for decoding the received images and audio signals and means for receiving an RF signal containing images and audio information and means responsive to the ID code signal for extracting the received image and audio signals of the images and the audio information from the RF signal, the receiver module having a first electro-mechanical junction;

b) an electronic camera module having an image sensor for capturing one or more images of a scene and producing image signals, and including means for receiving audio signals to produce audio information signals, a second processing unit for encoding and then superimposing the image and audio signals onto an RF carrier, and means for transmitting the RF carrier and superimposed signals, the electronic camera module having a second electromechanical junction for physically and electrically interconnecting the electronic camera module to the receiver module to form a linked configuration; and c) first and second means respectively included in the receiver module and the electronic camera module for disabling the RF carrier when the receiver module and the camera module are connected and enabling direct two way communications between the camera module and the receiver module and for transferring the ID code signal from the camera module to the receiver module where it is stored, to thereby permit the electronic camera module to further communicate with the receiver module via the RF carrier after they are separated.

2. The wireless communications system of claim 1 further including a plurality of electronic camera modules which are adapted to be coupled to the receiver module which in response to transferred ID codes permits each of the camera modules to communicate with the receiver module.

3. The wireless communications system of claim 1 further including an image recording and playback module having a third electromechanical junction for physically and electrically interconnecting the memory module to the electronic camera module and the receiver module to form a linked configuration.

4. The wireless communications system of claim 1 further including a printer module having a third electromechanical junction for physically and electrically interconnecting the memory module to the electronic camera module and the receiver module to form a linked configuration.

5. The wireless communications system of claim 1 further including a plurality of receiver modules which are adapted to be coupled to the electronic camera module which in response to transferred ID codes permits each of the receivers to communicate with the electronic camera.

* * * * *